April 2, 1963　　　　　E. ZEMLA　　　　　3,084,316
TUNNEL DIODE DRIVE DEVICE FOR ELECTRIC WATCHES
Filed Oct. 3, 1961　　　　　　　　　　　　　　2 Sheets-Sheet 1
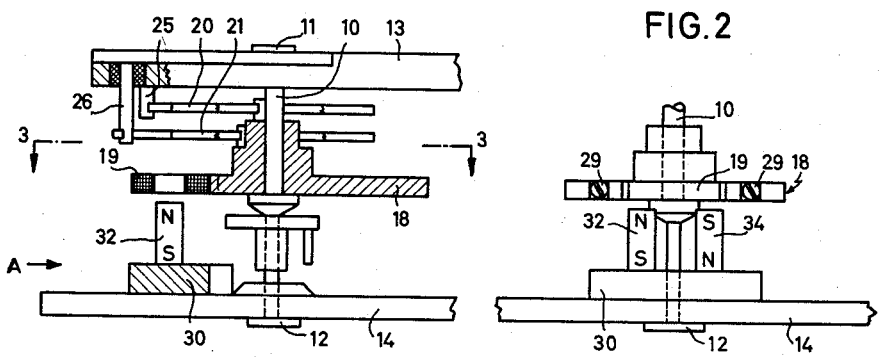
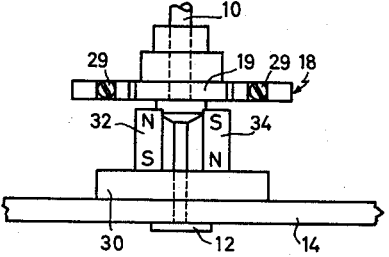
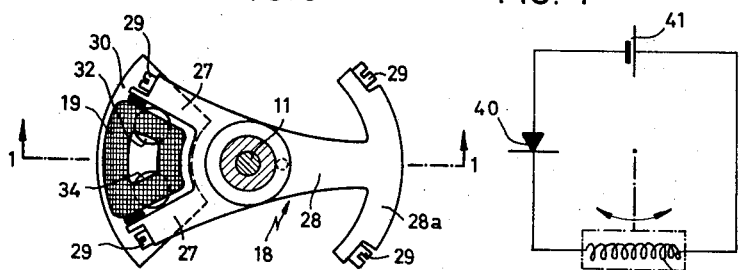
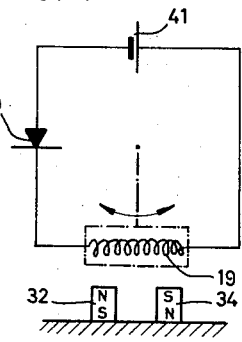
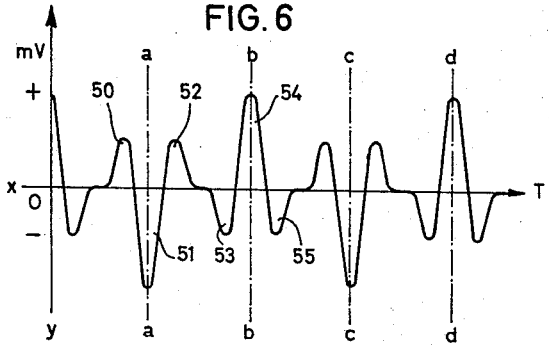
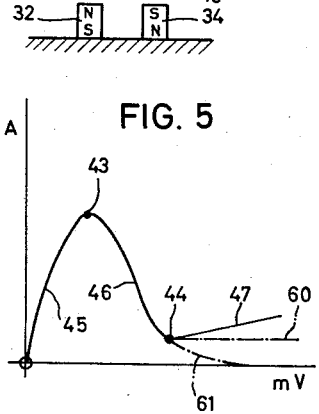
INVENTOR.
EWALD ZEMLA
BY
Davis, Hoxie, Faithfull & Hapgood
ATTORNEYS.

April 2, 1963   E. ZEMLA   3,084,316
TUNNEL DIODE DRIVE DEVICE FOR ELECTRIC WATCHES
Filed Oct. 3, 1961   2 Sheets-Sheet 2
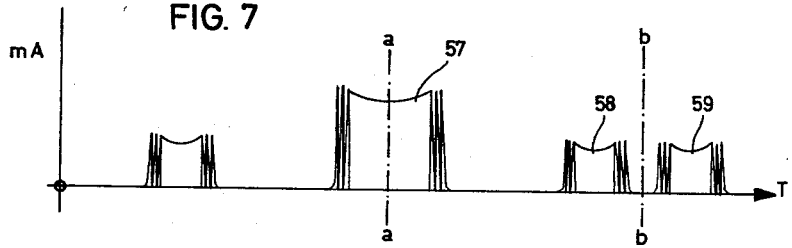
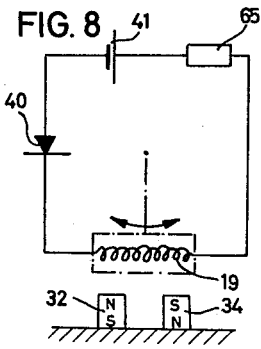
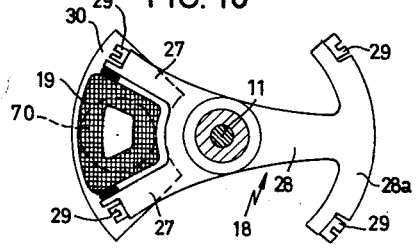
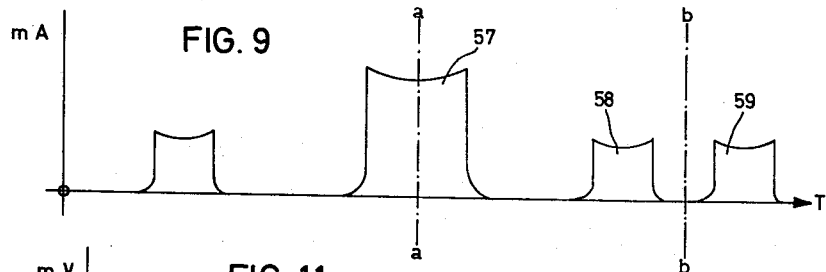
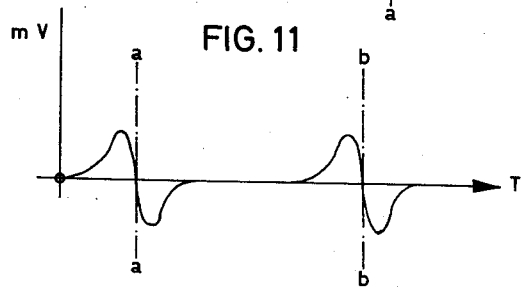
INVENTOR.
EWALD ZEMLA
BY
*Davis, Hoxie, Faithfull & Hapgood*
ATTORNEYS.

United States Patent Office 3,084,316
Patented Apr. 2, 1963

3,084,316
TUNNEL DIODE DRIVE DEVICE FOR
ELECTRIC WATCHES
Ewald Zemla, Frutigen, Switzerland, assignor to The
United States Time Corporation, Waterbury, Conn.,
a corporation of Connecticut
Filed Oct. 3, 1961, Ser. No. 142,693
Claims priority, application Germany Oct. 5, 1960
3 Claims. (Cl. 318—132)

The present invention relates to drive devices for electric watches, particularly drive devices controlled by electronic means.

Drive devices for electric watches which are controlled by electronic means without the use of contacts are already known. In these drives usually the arrangement is that a permanent magnet produces a stationary field which cooperates with a coil located on the balance wheel of the clock. This coil can be used both as the control and the driving coil, but a relatively complicated and expensive circuit is necessary for that purpose in which various triodes, capacitors and resistors are required, connected to each other by a complicated system of wires.

The present invention improves electric drive devices, particularly those used in wristwatches, which devices are controlled without the use of contacts by electronic means to drive a swinging body, for example, the balance wheel of a wristwatch, which periodically swings back and forth. The present invention includes a magnet system and at least one coil traversed by periodic current pulses, with either the coil or the magnet arranged on a stationary part and the other one on the swinging body. A so-called tunnel diode is arranged in series with the coil, the current of which diode is periodically varied by voltage pulses produced as the swinging body swings through the field of the magnet system. The invention, therefore, provides a minimum of electric component parts so that the construction is simple, relatively low in cost; and a complicated system of wires, the arranging of which in a small watch is difficult, is avoided. The usual tunnel diode is an electrical component whose characteristics is that upon a change of the voltage applied to the tunnel diode from its so-called trough point in both directions, the current increases in the same direction. Since for driving of the swinging body only half of this current pulse can be used for the drive in each swing, it is advantageous if the other current pulse is as small as possible. This can be achieved by having the characteristic of the tunnel diode here decrease little or not at all, or even decrease (possibly to zero) from the trough point toward the zero point.

In order to achieve self-regulation of the swinging body, it is preferable if, with normal amplitude of swing of the balance wheel, the current of the tunnel diode does not exceed the peak current lying between the trough point and the zero point.

With the current thus regulated, in case of an excessively large amplitude of swing the current in the tunnel diode decreases again in accordance with the characteristic of said diode, and the drive pulse is thus reduced. In this way, the characteristic of the tunnel diode is utilized for the self-regulation of the swinging body.

It is customary in the case of electric watches to provide a separate source of energy, for instance a primary or secondary cell, the voltage of which may decrease during discharge. In order to reduce the effect of this decreasing voltage, it is preferable if, when the source of energy is high, the voltage applied to the tunnel diode exceeds the trough-point voltage so that the tunnel diode operates during normal operation on the steep part of the characteristic. Upon discharge of the source of energy to a lower limit, the voltage of the source of energy applied to the tunnel diode can be smaller than the trough-point voltage. Instead of connecting the source of energy directly to the tunnel diode, a voltage divider circuit can also be used.

A favorable modification is obtained if a resistor is arranged in the circuit of the tunnel diode. In this way the action of the tunnel diode is improved, since the current pulses become even more pronounced because of the varying voltage division in the circuit. Furthermore, this resistor can also serve favorably to affect the pulse shape.

Various embodiments of the invention are shown in the drawing, in which:

FIG. 1 is a schematic side view of the drive device in accordance with the invention, including the balance wheel of a wristwatch, individual parts being shown in section along the line 1—1 of FIG. 3 or broken off;

FIG. 2 is a partial front view seen in the direction of the arrow A;

FIG. 3 is a section along the line 3—3 of FIG. 1;

FIG. 4 is a wiring diagram of the drive device shown in FIGS. 1 to 3;

FIG. 5 is the characteristic of a so-called tunnel diode;

FIG. 6 is an example of the theoretical production of voltage pulses in accordance with the arrangement shown in FIGS. 1 to 4;

FIG. 7 is a showing of the current pulses in the coil;

FIG. 8 is a wiring diagram corresponding to FIGS. 1 to 3, but using a resistor;

FIG. 9 is a showing of the current pulses in the coil, using the wiring diagram of FIG. 8;

FIG. 10 is a partial section corresponding to FIG. 3, but using a single permanent magnet;

FIG. 11 shows the voltage pulses produced in the coil in accordance with the arrangement shown in FIG. 10.

In FIGS. 1 to 3, there is shown a balance staff 10 which is supported at 11 in a plate 13 and at 13 in a bridge 14.

In FIGS. 3 to 5, there is shown a balance staff 10 which is supported at 11 in a plate 13 and at 12 in a bridge 14. On the balance staff 10, there is fastened a swinging body 18 which bears, spaced from the central axis, a drive coil 19. 20 and 21 are two coil springs, one end of each of which is connected with the bolts 25 and 26 respectively, which are fastened in a plate 13. Since the drive coil 19 receives its current via these two coil springs one of the coil springs is insulated from ground.

The swinging body 18 is so developed that it forms a fork-shaped part, between the arms 27 of which the coil 19 is so held by means of an adhesive, for instance a synthetic resin adhesive, at two opposite places that the coil, upon heating, can expand in radial direction toward both sides and thus retain its center of gravity relative to the axis of the balance staff. The part opposite the fork-shaped part of the swinging body is developed in the form of a T, and has a central web 28 and a crosspiece 28a. Equalizing screws arranged on the crosspiece 28a and the arms 27 are designated 29.

The connecting wires between the coil springs and drive coil are not shown in the drawing.

The customary means for transmitting the oscillation to the clockwork are furthermore arranged on the balance staff.

On the bridge 14, there is fastened a yoke 30 which consists of magnetizable material and on which there are arranged parallel to each other two permanent magnets 32 and 34. The polarity of the two magnets is in this connection reversed.

In the wiring diagram shown in FIG. 4, the coil is also designated 19 and the magnets 32 and 34. In series with the coil 19, there is arranged a tunnel diode 40 and a source of current 41. The last two parts and the connecting wires are not shown in FIGS. 1 to 3. Before discussing in detail the manner of operation of the circuit shown in FIG. 4, let us explain the graphs of FIGS. 5 and 6.

FIG. 5 shows the characteristic of a tunnel diode, the current being entered in milliamperes along the ordinates and the voltage in millivolts along the abscissa.

From the zero point, the characteristic rises to a maximum 43 and then drops to a trough point 44 which lies above the x-axis. From 44 on there is then a slight rise. The three parts of the characteristic are marked 45, 46 and 47. From this characteristic, it can be noted that upon a change of the voltage applied to the tunnel diode, the current, seen from the trough point 44, rises on both sides in the same direction, i.e., both a negative and a positive change in the trough-point voltage results in the same direction of the change in current. Since, however, the branch 47 of the characteristic rises generally less steeply, the change in current is ordinarily not uniform. This will be taken up in further detail below.

In FIG. 6, the voltage produced in the coil by the two permanent magnets 32 and 34 is shown. In this connection the time T is plotted on the x-axis and the induced electric voltage in millivolts on the y-axis. The central positions of the balance wheel are designated by the dot-dash lines a—a, b—b, c—c and d—d.

If these voltage pulses are now impressed on the circuit shown in FIG. 4, current pulses are produced in the coil 19 corresponding to the characteristic of the tunnel diode shown in FIG. 5. In this connection, it is to be noted that, corresponding to the slight rise of the branch 47 of the characteristic, practically no current pulses occur upon increasing the trough voltage, and accordingly in FIG. 7, there are shown only the current pulses which result upon reduction of the trough voltage corresponding to the voltage pulses in accordance with FIG. 6.

The manner of operation of the drive device will now be explained. Let us assume that the swinging body 18 is swinging back and forth. Before the passage through the zero position a—a of FIG. 6, a voltage pulse 50 will first of all be produced which acts on the branch 47 of the tunnel diode and therefore causes practically no change in the trough current. This trough current is so small that it can be neglected. It has therefore not been shown in FIG. 7. In contradistinction to this, the voltage pulse 51 produces a relatively high current pulse 57 since it reduces the trough voltage and the tunnel diode therefore operates on the branch 46. The voltage pulse 52, similarly to the voltage pulse 50, has no effect at all. Upon the next passage through zero, b—b, the two voltage pulses 53 and 55 produce a current pulse 58 and 59, while the voltage pulse 54 remains practically without effect. This process is then continuously repeated.

The two coil springs 20 and 21 serve both for the electric connection of the coil and as force storage means in the same manner as the customary spiral springs used in watches.

From the foregoing, it is evident that it is advisable for the action of the tunnel diodes for the branch 47 of the characteristic shown in FIG. 5 to rise as little as possible. If this branch is horizontal, as indicated in dash-dot line at 60, this part of the characteristic cannot enter into action at all, and it is particularly favorable, when in accordance with the dash-dot line 61 the current of the tunnel diode drops to zero upon an increase in the trough-point voltage that the trough-current then even ceases entirely.

When the voltage pulses produced in the coil are such that the tunnel diode operates merely on the branch 46 of the characteristic, substantially constant periodic drive pulses are produced. If now the balance wheel swings beyond the normal amplitude of swing, and if the peak point 43 of the characteristic of the tunnel diode (FIG. 5) is thereby exceeded, the current flowing in the coil decreases so that the working pulse is reduced. In this way, an automatic speed regulation is obtained.

In the wiring diagram shown in FIG. 8, all parts bear the same designation as in FIG. 4, but a resistor 65 has been also provided in series with the tunnel diode. This resistor has the effect that when the tunnel diode is operating on the branch 46, i.e., when the tunnel diode operates as a negative resistance, the division of the voltage in the entire circuit is so changed that the voltage at the tunnel diode decreases further, and the swinging along the branch 46 is thus favored.

By the resistance, there can furthermore also be obtained a more favorable shape of the current pulses and in this connection the oscillations at the beginning and end of the current pulse can be reduced, or even entirely eliminated. This is shown schematically in FIG. 9. Furthermore, there is obtained a broadening of the current pulses, as compared with the shape shown in FIG. 7, whereby the drive is further improved.

In the arrangement shown in FIG. 10, instead of two magnets 32 and 34, only a single, relatively large permanent magnet 70 arranged in rest position symmetrically to the coil 19 is provided. When using such a magnet, there are produced in the coil 19 induced voltages which are shown in further detail in FIG. 11. Since these voltage pulses are in each case equal approximately to a full sinusoidal oscillation, the current pulses occurring in the coil are identical to each other. These identical current pulses, and thus identical drive pulses may have a favorable effect in certain types of watches.

I claim:

1. In a wrist watch, having a balance wheel mounted for oscillatory movement and an associated hair spring, the combination of a coil on said wheel comprising two spaced and substantially radial arms interconnected at their inner and outer ends to complete a closed loop except at its two terminals, a pair of magnets providing two parallel fields of opposite polarity normal to and intersecting the path of said coil arms and spaced apart by substantially the same distance as said arms, and a tunnel diode and source of unidirectional current in series with said coil and each other, the said source normally biasing said diode for operation about the trough point of its characteristic curve, and said coil and said fields being so related that a pulse induced in the coil by movement of its arms into said fields in one direction decreases the voltage across said diode, whereby the current flowing in said coil from said source is increased to generate two simultaneous unidirectional driving forces on said coil arms to move it in the direction of said entrance movement.

2. The system of claim 1 having also a resistance in series with said diode, source and coil.

3. The system of claim 1 in which, upon motion of the coil beyond its normal amplitude the current through the said diode is decreased below its peak and the driving force is decreased to effect a self-regulation.

No references cited.